(12) United States Patent
Dunckley et al.

(10) Patent No.: US 7,839,602 B2
(45) Date of Patent: Nov. 23, 2010

(54) BASE DAM IN A DATA STORAGE SYSTEM TO REDUCE OR ELIMINATE MOTOR LEAKAGE

(75) Inventors: James Anthony Dunckley, Boulder, CO (US); Francisco Obregon, Ripon, CA (US); Daniel Robert Ohlsen, Longmont, CO (US); Michael Joseph Russell, Longmont, CO (US); John Edward Scura, Paso Robles, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 851 days.

(21) Appl. No.: 11/753,740

(22) Filed: May 25, 2007

(65) Prior Publication Data

US 2008/0291569 A1 Nov. 27, 2008

(51) Int. Cl.
*G11B 33/14* (2006.01)

(52) U.S. Cl. .................................. 360/99.08; 360/97.02

(58) Field of Classification Search .............. 360/99.11, 360/99.08, 99.04, 97.02
See application file for complete search history.

(56) References Cited

U.S. PATENT DOCUMENTS

| | | | |
|---|---|---|---|
| 5,533,812 A | 7/1996 | Leuthold et al. ............ 384/112 |
| 5,715,116 A | 2/1998 | Moritan et al. ........... 360/99.08 |
| 5,739,980 A | 4/1998 | Brooks ..................... 360/99.08 |
| 5,870,247 A | 2/1999 | Schirle ..................... 360/97.02 |
| 5,977,674 A | 11/1999 | Leuthold et al. .............. 310/90 |
| 6,501,615 B1 * | 12/2002 | Kelsic et al. ............. 360/97.02 |
| 6,891,696 B1 * | 5/2005 | Ou-Yang et al. ......... 360/97.02 |
| 6,970,322 B2 * | 11/2005 | Bernett ..................... 360/97.01 |
| 7,001,074 B2 | 2/2006 | Dittmer et al. .............. 384/107 |
| 7,012,781 B2 * | 3/2006 | Chee et al. ............... 360/97.01 |
| 7,137,739 B2 | 11/2006 | Dittmer et al. .............. 384/107 |
| 7,307,811 B2 * | 12/2007 | Xu et al. .................. 360/97.01 |
| 7,652,845 B2 * | 1/2010 | Xu et al. .................. 360/97.02 |
| 2005/0088777 A1 * | 4/2005 | Chee et al. ............... 360/97.01 |
| 2005/0099734 A1 * | 5/2005 | Rafaelof .................. 360/264.8 |
| 2006/0187579 A1 * | 8/2006 | Xu et al. .................. 360/97.02 |

\* cited by examiner

*Primary Examiner*—Julie Anne Watko
(74) *Attorney, Agent, or Firm*—Leanne Taveggia Farrell; Westman, Champlin & Kelly, P.A.

(57) ABSTRACT

A base for a data storage system is provided having an inner facing surface and an outer facing surface. The base includes a motor well. Formed with inner surface of facing surface of the base includes a medium region, an actuator region and a dam. The medium region is defined by a medium region planar surface surrounding a portion of the motor well, a leading surface and a trailing surface. The actuator region is defined by an actuator region planar surface that is recessed from the medium region planar surface, the leading surface, the trailing surface and a remaining portion of the motor well. The dam has a dam planar surface that surrounds the remaining portion of the motor well and is positioned on the actuator region planar surface between the leading surface and the trailing surface.

20 Claims, 4 Drawing Sheets

BASE DAM IN A DATA STORAGE SYSTEM TO REDUCE OR ELIMINATE MOTOR LEAKAGE

BACKGROUND

A typical data storage system includes a rigid housing having a base and top cover that encloses a variety of components. The components include a medium or media for storage of digital information that is mounted on a motor assembly. The components also include an actuator assembly used to position one or more transducers along the medium to read and/or write information to particular locations on the medium. The transducers are mounted to a suspension of the actuator assembly. The suspension maintains the transducers adjacent to or in contact with the data surface of the medium. A voice coil motor is used to precisely position the actuator assembly.

Motor assemblies can release harmful chemicals into the housing of the data storage system within which it resides. These released chemicals can cause damage to the transducers and medium also enclosed within the housing of the data storage system. Traditional ways to prevent damage caused by chemical leakage include reducing or eliminating particular types of problematic chemicals in the motor assembly as well as by reducing the gap size between the motor and the base of the housing to reduce leakage. Although these methods can somewhat reduce the severity of the problem, these methods fail to significantly reduce the presence of chemicals in the data storage system enough to eliminate the problem. In addition, traditional ways of preventing damage by chemicals tend to be cost inefficient.

SUMMARY

A base for a data storage system is provided having an inner facing surface and an outer facing surface. The base includes a motor well, a medium region, an actuator region and a dam. The medium region is formed with the inner facing surface of the base and is defined by a medium region planar surface surrounding a portion of the motor well, a leading surface and a trailing surface. The actuator region is also formed with the inner surface of the base and is defined by an actuator region planar surface that is recessed from the medium region planar surface, the leading surface, the trailing surface and a remaining portion of the motor well. The dam is also formed with the inner facing surface and has a dam planar surface. The dam surrounds the remaining portion of the motor well and is positioned on the actuator region planar surface between the leading surface and the trailing surface.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
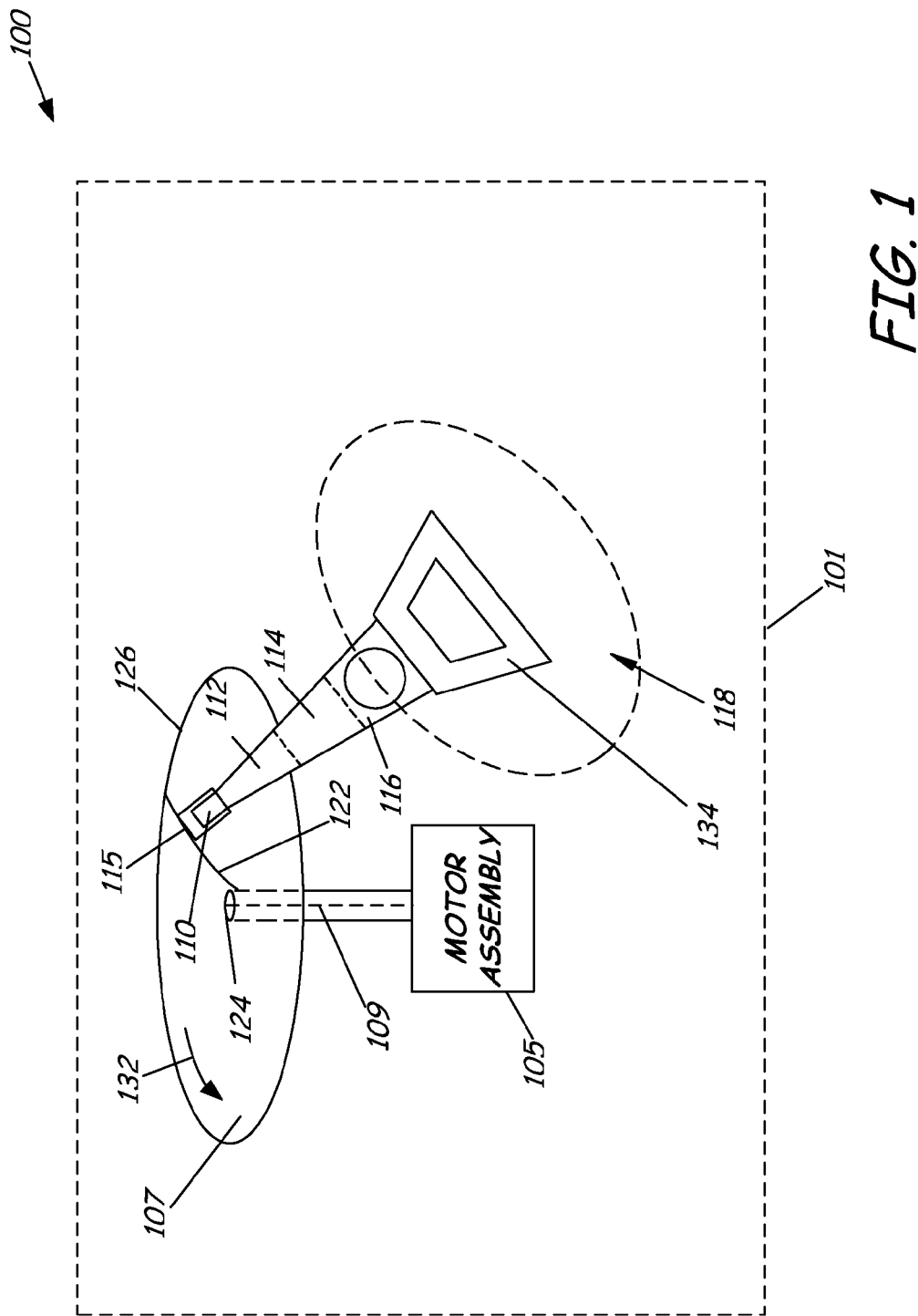
FIG. 1 is a simplified schematic diagram of a data storage system.

FIG. 1 is a simplified schematic diagram of a disc drive 100 in which embodiments of the present invention are useful. Disc drives are common types of data storage systems. While embodiments of the disclosure are described in terms of disc drives, other types of data storage system should be considered in light of the disclosure. Disc drive 100 includes an enclosure 101. Disc drive 100 further includes a disc or medium 107. Those skilled in the art should recognize that disc drive 100 can contain a single disc, as illustrated in FIG. 1, or multiple discs included in a disc pack. As illustrated in FIG. 1, medium 107 is mounted on a motor assembly 105, such as a spindle motor assembly, for rotation about central axis 109. Each disc surface has an associated slider 110. Each slider 110 carries a read/write head for communication with the surface on the disc.

Each slider 110 is supported by a suspension 112 which is in turn attached to a track accessing arm 114 of an actuator mechanism 116. Actuator mechanism 116 is rotated about a shaft by a voice coil 134 of a voice coil motor 118. As voice coil motor 118 rotates actuator mechanism 116, slider 110 moves in an arcuate path 122 between a disc inner diameter 124 and a disc outer diameter 126.

Figure 2:
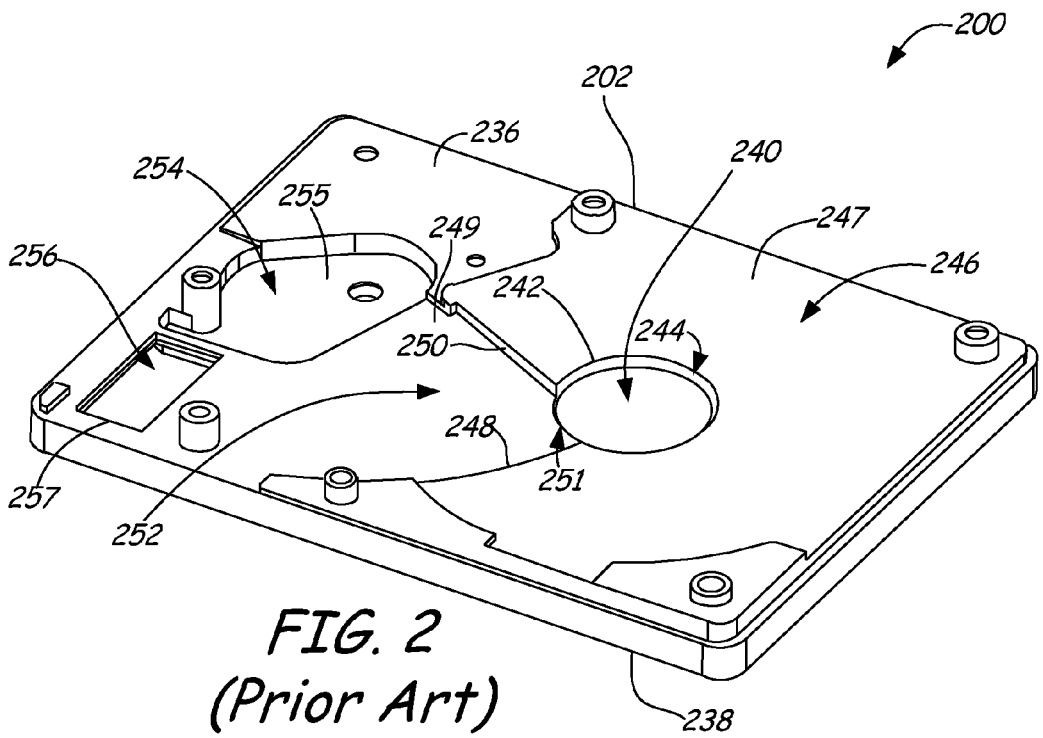
FIG. 2 illustrated a top perspective view of a prior art base of a data storage system.

FIG. 2 illustrates a top perspective view of a prior art base 202 of a disc drive 200 with all internal components removed. Typically, an enclosure of a disc drive, such as enclosure 101 in FIG. 1, includes a base and a top cover. Base 202 includes an inner facing surface 236 and an outer facing surface 238. Base 202 also includes accommodating features for accommodating various internal components of a disc drive that have been removed. Such accommodating features are integrally formed with base 302 by metal injection molding, stamping, machining or other type of process.

Base 202 includes a motor well 240. Motor well 242 is one example of an accommodating feature of base 202. Motor well 240 is integrally formed with base 202 and is configured to accommodate a motor assembly, such as motor assembly 105 illustrated in FIG. 1. In some embodiments, motor well 240 includes a motor well aperture 242. In other embodiments, motor well 240 includes a floor (not illustrated) such that motor well is open to inner facing surface 236 and closed to outer facing surface 238. A medium region 246 is another example of an accommodating feature of base 202. Medium region 246 is integrally formed with base 202 and accommodates one or more media. Medium region 246 includes a medium region planar surface 247 that surrounds a portion 244 of motor well 240. Medium region 246 reduces airflow turbulence under the media or medium in the enclosure of the data storage system. Medium region 246 also includes a leading surface 248 and a trailing surface 250.

An actuator region 252 is another example of an accommodating feature of base 202. Actuator region 252 accommodates at least one track accessing arm of an actuator mechanism, such as track accessing arm 114 of actuator mechanism 116 illustrated in FIG. 1. As illustrated in FIG. 2, actuator region 252 includes an actuator region planar surface 249 which is recessed below medium region planar surface 247.

Often, a track accessing arm communicates with a bottom surface of a medium and requires space below the medium to rotate back and forth. Actuator region 252 provides such space and is defined by actuator region planar surface 249, leading surface 248 of medium region 246, trailing surface 250 of medium region 246 and a remaining portion 251 of motor well 240.

A voice coil motor region 254 is another example of an inner surface accommodating feature of base 202. Voice coil motor region 254 accommodates a voice coil motor, such as voice coil motor 118 illustrated in FIG. 1. As illustrated in FIG. 2, voice coil motor region 254 includes a voice coil motor region planar surface 255 that is recessed below actuator region planar surface 249 and is at least defined by a portion of actuator region 252.

An electronic circuit region 256 is yet another example of an inner surface accommodating feature of base 202. Electronic circuit region 256 includes an electronic circuit aperture 257 that extends between inner facing surface 236 and outer facing surface 238 of base 202. Electronic circuit region 256 is configured to accommodate circuitry for transferring data from components internal to a data storage system to components external to the data storage system.

Figure 3:
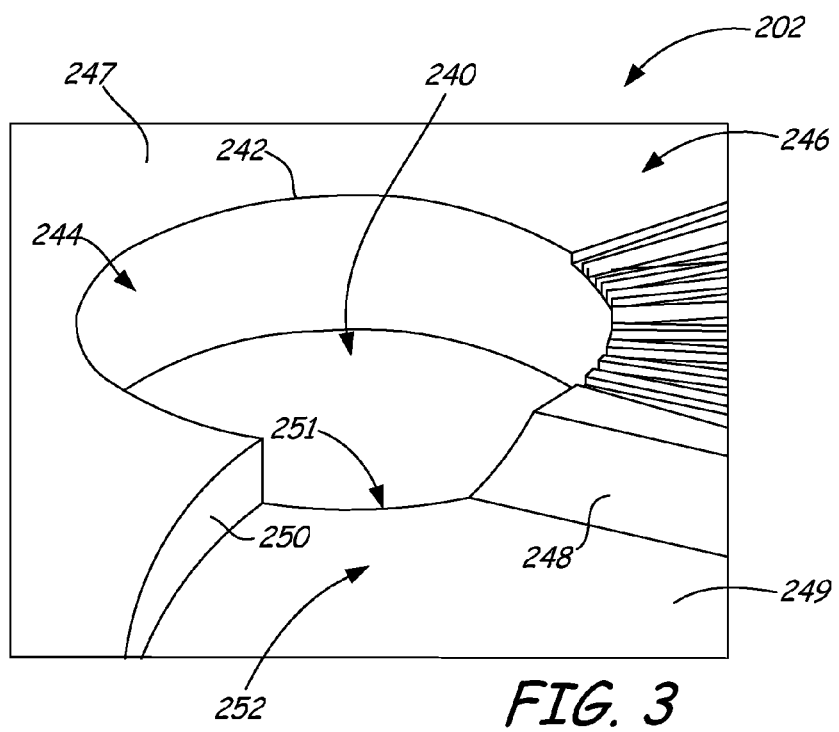
FIG. 3 is an enlarged perspective view of a motor well of the prior art base of FIG. 2.

FIG. 3 illustrates an enlarged perspective view of motor well 240, medium region 246 and actuator region 252 of prior art base 202. While in the embodiment illustrated in FIG. 3 motor well 240 includes motor well aperture 242, it should be understood that in other embodiments motor well 240 can include a floor such that the motor well is closed to outer facing surface 238 and open to inner facing surface 236. Medium region planar surface 247 of medium region 246 is raised above actuator region planar surface 249 and is also defined by leading surface 248, trailing surface 250 and portion 244 of motor well 240. Actuator region 252 is defined by actuator region planar surface 249, leading surface 248 of medium region 246, trailing surface 250 of medium region 246 and remaining portion 251 of motor well 240.

Figure 4:
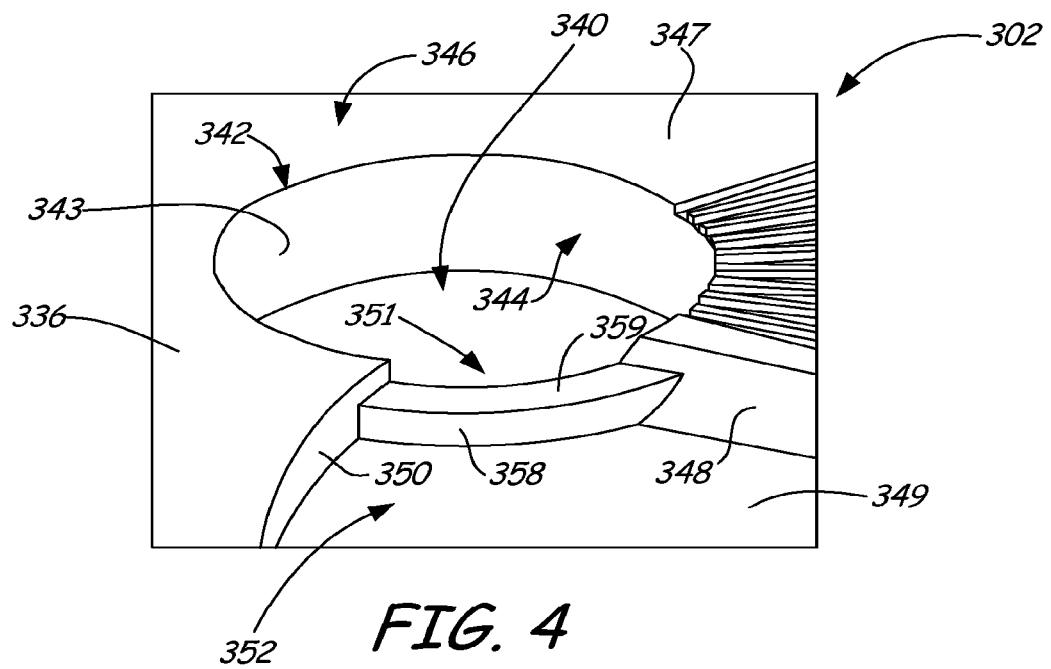
FIG. 4 is an enlarged perspective view of a motor well of a base under one embodiment.

Under one embodiment, FIG. 4 illustrates an enlarged perspective view of a motor well 340, a medium region 346 and an actuator region 352 formed with an inner facing surface 336 of a base 302 for a disc drive. Motor well 340 includes a motor well aperture 342 having a perimeter 343. In some embodiment, the motor well aperture 342 extends between inner facing surface 336 and an outer facing surface (not illustrated in FIG. 4). In other embodiments, motor well 340 is open to inner facing surface 336 and closed to the outer facing surface. Medium region 346 is defined by a medium region planar surface 347, a leading surface 348, a trailing surface 350 and a portion or first angular circumferential portion 344 of the perimeter 343 of motor well 340. Actuator region 352 includes actuator region planar surface 349 which is recessed from medium region planar surface 347. Actuator region 352 is defined by actuator region planar surface 349, leading surface 348 of medium region 346, trailing surface 350 of medium region 346 and a remaining portion or second angular circumferential portion 351 of the perimeter 343 of motor well 340.

In one embodiment, base 302 also includes a dam 358. Dam 358 is formed integrally with inner facing surface 336 of base 302 and extends from actuator region planar surface 349 to a dam planar surface 359. Dam 358 is positioned between leading surface 348 and trailing surface 350 of medium region 346. In particular, dam 358 partially surrounds the remaining portion 351 of motor well 340 from leading surface 348 to trailing surface 350. Dam 358 provides base 302 with a more uniform azimuthal spacing between base 302 and a motor assembly positioned in motor well 340. With more uniform spacing between base 302 and a motor assembly, chemical leakage from a motor assembly in motor well 340 can at least be significantly reduced if not totally eliminated from the interior environment of the disc drive.

Figure 5:
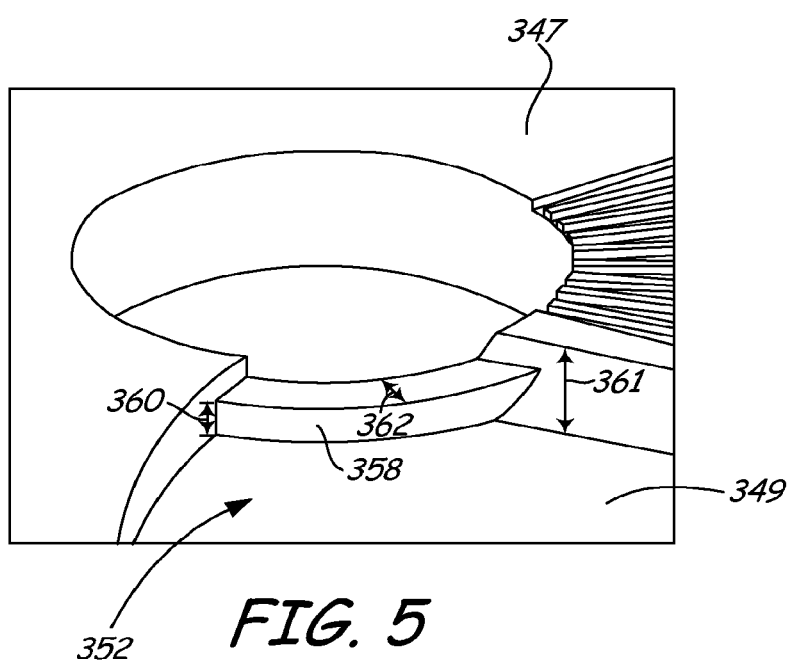
FIG. 5 is an enlarged perspective view of the motor well of FIG. 4.

As illustrated in FIG. 5, dam 358 includes a dam height 360. Dam height 360 is at most a distance 361 between actuator region planar surface 349 and medium region planar surface 347. In general, dam height 360 is less than a distance 361 between actuator region planar surface 349 and medium region planar surface 347. Dam 358 includes a dam width 362. Dam height 360 and dam width 362 are selectively determined based on dimensions of a track accessing arm, such as track accessing arm 114, located in actuator region 352. A track accessing arm located in the actuator region 352 requires enough space to seek to an inner diameter of a medium, such as inner diameter 124 of medium 107 illustrated in FIG. 1.

Figure 6:
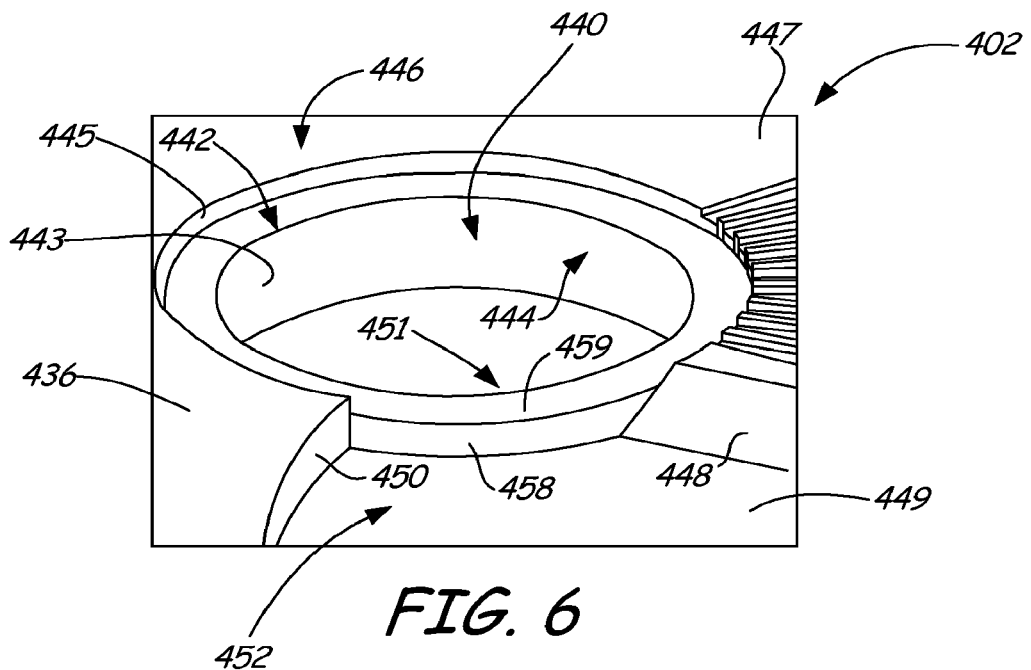
FIG. 6 is an enlarged perspective view of a motor well of a base under one embodiment.

FIG. 6 is an enlarged perspective view of a motor well 440, a medium region 446 and an actuator region 452 formed with an inner facing surface 436 of a base 402 for a disc drive under one embodiment. While motor well 440 includes a motor well aperture 442 having a perimeter 443 in the embodiment illustrated in FIG. 6, it should be understood that in other embodiments motor well 440 includes a floor such that the motor well is closed to an outer facing surface (not illustrated in FIG. 6) and open to inner facing surface 436. Motor well aperture 442 extends between inner facing surface 436 and the outer facing surface. Medium region 446 is defined by a medium region planar surface 447, a leading surface 448, a trailing surface 450 and a portion or first angular circumferential portion 444 of the perimeter 443 of motor well 440. Actuator region 452 includes actuator region planar surface 449 which is recessed from medium region planar surface 447. Actuator region 452 is defined by actuator region planar surface 449, leading surface 448 of medium region 446, trailing surface 450 of medium region 446 and a remaining portion or second angular circumferential portion 451 of the perimeter 443 of motor well 440.

In one embodiment, base 402 also includes a dam 458. Dam 458 is formed integrally with inner facing surface 436 of base 402 and extends from actuator region planar surface 449 to a dam planar surface 459. Dam 458 is positioned between leading surface 448 and trailing surface 450 of medium region 446. In particular, dam 458 partially surrounds the remaining portion 451 of motor well 440 from leading surface 448 to trailing surface 450. Dam 458 provides base 402 with a more uniform azimuthal spacing between base 402 and a motor assembly positioned in motor well 440. With such spacing between base 402 and a motor assembly, chemical leakage from a motor assembly in motor well 440 can at least be significantly reduced if not totally eliminated from the interior environment of the disc drive.

Figure 7:
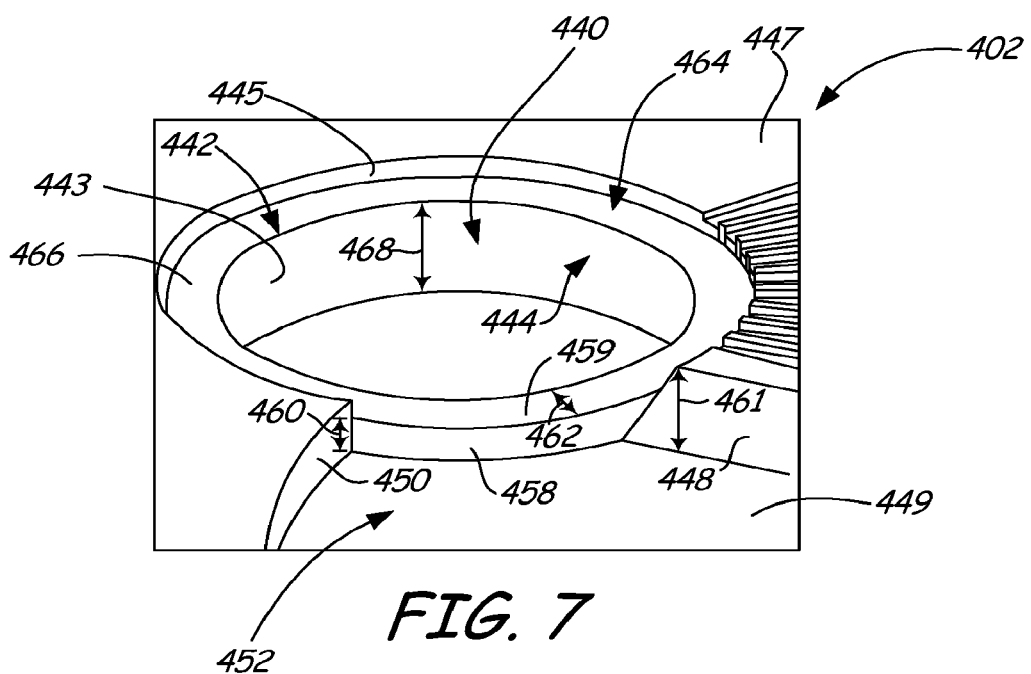
FIG. 7 is an enlarged perspective view of a motor well of FIG. 6.

As illustrated in FIGS. 6 and 7, dam 458 includes a dam height 460. Dam height 460 is at most a distance 461 between actuator region planar surface 449 and medium region planar surface 447. In general, dam height 460 is less than a distance 461 between actuator region planar surface 449 and medium region planar surface 447. Dam 458 includes a dam width 462. Dam height 460 and dam width 462 are selectively determined based on dimensions of a track accessing arm, such as track accessing arm 114, located in actuator region 452. A track accessing arm located in the actuator region 452 requires enough space to seek to an inner diameter of a medium, such as inner diameter 124 of medium 107 illustrated in FIG. 1.

In the embodiment illustrated in FIGS. 6 and 7, base 402 also includes a motor well channel 464 formed along medium region planar surface 447 that surrounds and abuts portion 444 of motor well 440 from leading surface 448 to trailing surface 450. Motor well channel 464 provides motor well 440 with a more axis-symmetrical accommodating feature as well as an improvement in reducing and/or eliminating chemical leakage into the data storage system compared to use of dam 458 alone.

Motor well channel 464 includes a motor well channel planar surface 466 recessed into the medium region planar surface 447 and bounded by the portion or first angular circumferential portion 444 of the perimeter 443 of the motor well 440. Motor well channel 464 also includes a motor well channel wall 445 positioned outwardly from the portion or first angular circumferential portion 444 of the perimeter 443 of the motor well 440 and bounded at least by the leading surface 448, the trailing surface 450 and the medium region planar surface 447. Motor well channel 464 includes a channel height 468 that extends between outer facing surface of base 402 and motor well channel planar surface 466, regardless of whether motor well 440 includes a motor well aperture 442 or motor well 440 is closed to outer facing surface of base 402. Channel height 468 is less than a distance between outer facing surface of base 402 and medium region planar surface 447. In addition, motor well channel planar surface 466 is in plane with and continuous with dam planar surface 459.

It is to be understood that even though numerous characteristics and advantages of various embodiments of the disclosure have been set forth in the foregoing description, this disclosure is illustrative only, and changes may be made in detail, especially in matters of structure and arrangement of parts within the principles of the disclosure to the full extent indicated by the broad general meaning of the terms in which the appended claims are expressed. For example, the particular elements may vary depending on the particular application of the top cover while maintaining substantially the same functionality without departing from the scope and spirit of the disclosure. In addition, although the embodiments described herein are directed to a base dam a disc drive, it will be appreciated by those skilled in the art that the teachings of the disclosure can be applied to other types of data storage systems, without departing from the scope and spirit of the disclosure.

What is claimed is:

1. A base for a data storage system having an inner facing surface and an outer facing surface, the base comprising:
    a motor well including a perimeter;
    a medium region formed with the inner facing surface of the base, the medium region including a medium region planar surface defined at least by a portion of the perimeter of the motor well, a leading surface and a trailing surface, wherein the leading and trailing surfaces intersect the perimeter of the motor well;
    an actuator region formed with the inner surface of the base, the actuator region including an actuator region planar surface that is recessed from the medium region planar surface and defined at least by the leading surface, the trailing surface and a remaining portion of the perimeter of the motor well; and
    a dam formed with the inner facing surface and protruding from the actuator region planar surface to a dam planar surface and extending along the remaining portion of the perimeter of the motor well from the leading surface to the trailing surface.

2. The base of claim 1, wherein the dam extends from the actuator region planar surface towards the medium region planar surface.

3. The base of claim 1, wherein the motor well, the medium region, the actuator region and the dam are integrally formed with the inner facing surface of the base.

4. The base of claim 1, wherein the dam comprises a dam height defined between the actuator region planar surface and the dam planar surface.

5. The base of claim 4, wherein the dam height is at least as great as a distance between the actuator region planar surface and the medium region planar surface.

6. The base of claim 4, wherein the dam height is less than the distance between the actuator region planar surface and the medium region planar surface.

7. The base of claim 1, further including a motor well channel comprising:
    a motor well channel planar surface recessed into the medium region planar surface and bounded by the portion of the perimeter of the motor well that extends from the leading surface to the trailing surface and defines the medium region planar surface; and
    a motor well channel wall positioned outwardly from the perimeter of the motor well, the motor well channel wall bounded at least by the leading surface, the trailing surface and the medium region planar surface.

8. The base of claim 7, wherein the motor well channel comprises a motor well channel height defined between the outer facing surface and the motor well channel planar surface.

9. The base of claim 8, wherein the motor well channel height is less than the distance between the actuator region planar surface and the medium region planar surface.

10. The base of claim 8, wherein the motor well channel planar surface is in plane and continuous with the dam planar surface.

11. A base for a data storage system, comprising:
    an outer facing surface;
    an inner facing surface;
    wherein the inner facing surface includes integrally formed features comprising:
        a circular motor well for accommodating a motor assembly, the motor well having a perimeter that includes a first angular circumferential portion and a second angular circumferential portion;
        a medium region for accommodating a medium, the medium region including a medium region planar surface bounded at least by the first angular circumferential portion of the perimeter of the motor well, a leading surface and a trailing surface, wherein the leading and trailing surfaces intersect the perimeter of the motor well;
        an actuator region for accommodating an actuator, the actuator region including an actuator region planar surface that is recessed from the medium region planar surface and bounded at least by the leading surface, the trailing surface and the second angular circumferential portion of the perimeter of the motor well; and
        a dam extending from the actuator region planar surface to a dam planar surface and the dam extending along the second angular circumferential portion of the motor well from the leading surface to the trailing surface.

12. The base of claim 11, wherein the dam comprises a dam height defined between the actuator region planar surface and the dam planar surface.

13. The base of claim 12, wherein the dam height is at least as great as a distance between the actuator region planar surface and the medium region planar surface.

14. The base of claim 12, wherein the dam height is less than the distance between the actuator region planar surface and the medium region planar surface.

15. The base of claim 11, further including a motor well channel comprising a motor well channel planar surface recessed into the medium region planar surface and bounded by the first angular circumferential portion of the perimeter of the motor well; and a motor well channel wall positioned outwardly from the first angular circumferential portion perimeter of the motor well, the motor well channel wall bounded at least by the leading surface, the trailing surface and the medium region planar surface.

16. The base of claim 15, wherein the motor well channel comprises a motor well channel height defined between the outer facing surface and the motor well channel planar surface.

17. The base of claim 16, wherein the motor well channel height is less than the distance between the actuator region planar surface and the medium region planar surface.

18. The base of claim 16, wherein the motor well channel planar surface is in plane and continuous to the dam planar surface.

19. A base for a data storage system having an inner facing surface and an outer facing surface, the base comprising:

a motor well having a perimeter including a first angular circumferential portion and a second angular circumferential portion;

a medium region formed with the inner facing surface of the base, the medium region including a medium region planar surface that terminates along the first angular circumferential portion of the motor well, along a leading surface and along a trailing surface, wherein the leading and trailing surfaces intersect with the perimeter of the motor well;

an actuator region formed with the inner surface of the base, the actuator region including an actuator region planar surface that is recessed from the medium region planar surface and terminates along the leading surface, the trailing surface and the second angular circumferential portion of the motor well; and dam means formed with the inner facing surface of the base, the dam means extending from the actuator region planar surface to a dam planar surface and extending along the second angular circumferential portion of the motor well for reducing chemical leakage from the motor well into the data storage system.

20. The base of claim 19, further comprising:

channel means for further reducing leakage of chemical from the motor well into the data storage system.

\* \* \* \* \*